United States Patent
McFarlane

(10) Patent No.: US 7,059,812 B2
(45) Date of Patent: Jun. 13, 2006

(54) PORTABLE, HAND-HELD MULTIPLE BIT DRILL

(76) Inventor: Leslie Andrew McFarlane, 34 Cherry St., College Woods, Central Islip, NY (US) 11772

( * ) Notice: Subject to any disclaimer, the term of this patent is extended or adjusted under 35 U.S.C. 154(b) by 0 days.

(21) Appl. No.: 10/735,028

(22) Filed: Dec. 12, 2003

(65) Prior Publication Data

US 2004/0136797 A1    Jul. 15, 2004

Related U.S. Application Data

(60) Provisional application No. 60/439,752, filed on Jan. 13, 2003.

(51) Int. Cl.
*B23B 47/04*    (2006.01)

(52) U.S. Cl. .................... 408/53; 408/46; 408/124

(58) Field of Classification Search .............. 408/46, 408/53, 124; 279/128
See application file for complete search history.

(56) References Cited

U.S. PATENT DOCUMENTS

| | | | | |
|---|---|---|---|---|
| 238,244 | A | * | 3/1881 | Morgan ................ 408/117 |
| 513,088 | A | * | 1/1894 | Crane ..................... 408/53 |
| 545,827 | A | * | 9/1895 | Silcott ..................... 7/158 |
| 658,782 | A | * | 10/1900 | Kellogg ................... 408/53 |
| 790,823 | A | * | 5/1905 | Garfield .................. 408/42 |
| 1,023,021 | A | * | 4/1912 | Lagarde et al. ........... 81/57 |
| 1,183,535 | A | | 5/1916 | Chayes |
| 1,414,589 | A | * | 5/1922 | Seavey ................... 408/1 R |
| 1,430,339 | A | * | 9/1922 | Tucker .................. 408/117 |
| 1,441,416 | A | | 1/1923 | Goldstein et al. |
| 1,485,647 | A | | 3/1924 | Trust et al. |
| 1,521,158 | A | | 12/1924 | King |
| 1,928,756 | A | * | 10/1933 | Klausmeyer ............ 408/135 |
| 2,492,391 | A | * | 12/1949 | Minek .................. 74/665 GA |
| 2,706,918 | A | | 4/1955 | Blatt |
| 2,879,675 | A | * | 3/1959 | Morris ................. 74/665 GA |
| 3,280,351 | A | | 10/1966 | Wolter et al. |
| 3,652,175 | A | | 3/1972 | Walters et al. ............ 408/46 |
| 3,924,493 | A | * | 12/1975 | Penner ................... 81/177.85 |
| 4,061,437 | A | | 12/1977 | Strange et al. ............ 408/42 |
| 4,090,803 | A | | 5/1978 | Haley ..................... 408/12 |
| 4,286,902 | A | | 9/1981 | Gagliano et al. .......... 408/79 |
| 4,396,318 | A | | 8/1983 | Jensen et al. ............. 408/95 |

(Continued)

FOREIGN PATENT DOCUMENTS

DE    DK 42432    * 12/1965

(Continued)

*Primary Examiner*—Boyer D. Ashley
*Assistant Examiner*—Michael W. Talbot
(74) *Attorney, Agent, or Firm*—Alfred M. Walker; Frank Tolin

(57) ABSTRACT

A portable hand-held multiple bit drill imparts a set of linearly aligned work areas of a work piece, which work areas are respectively and simultaneously drilled by the respective drill bits. A rotary power source communicates with a hand-held body holding a plurality of chucks. Each pair of adjacent chucks having a uniform pre-set spacing apart from each other. The drill chucks holding the drill bits are rotated by respective linearly aligned drive gears, which are rigidly attached to respective shafts driving each respective chuck of the plurality of chucks. The drive gears are rotated by a centrally located central gear, which is attached to a central drive shaft emerging from the hand held housing. The central gear is driven by the power source and each drive gear is a meshed idler gear, which reverses direction, such that all the drive gears are rotated in a same, pre-determined direction.

10 Claims, 4 Drawing Sheets

U.S. PATENT DOCUMENTS

| | | | |
|---|---|---|---|
| 4,674,925 A * | 6/1987 | Thornton et al. | 408/1 R |
| 4,728,230 A | 3/1988 | Blum | 408/53 |
| 4,818,157 A * | 4/1989 | Kouvelis | 408/240 |
| 4,944,638 A * | 7/1990 | Brohammer | 408/59 |
| 4,995,768 A * | 2/1991 | Craft | 408/239 A |
| 5,085,543 A * | 2/1992 | Click | 408/48 |
| 5,147,367 A | 9/1992 | Ellis | 606/96 |
| 5,205,682 A | 4/1993 | Jinkins | 408/46 |
| 5,217,331 A | 6/1993 | Ericksen | 408/42 |
| 5,549,613 A | 8/1996 | Goble et al. | 606/80 |
| 5,785,468 A * | 7/1998 | Peritz | 408/226 |
| 6,007,277 A | 12/1999 | Olson et al. | 408/35 |
| 6,695,552 B1 * | 2/2004 | Kays et al. | 408/124 |
| 2003/0180106 A1 * | 9/2003 | Russell | 408/1 R |

FOREIGN PATENT DOCUMENTS

| | | | |
|---|---|---|---|
| FR | 892798 | * | 3/1944 |
| GB | 2170753 A | * | 8/1986 |
| JP | 62277207 A | | 12/1987 |

* cited by examiner

PORTABLE, HAND-HELD MULTIPLE BIT DRILL

RELATED APPLICATIONS

This application is based upon provisional application No. 60/439,752, filed Jan. 13, 2003 and claims benefit therefrom under 35 U.S.C. 119(e).

FIELD OF THE INVENTION

The present invention relates to portable, hand-held multiple bit drills for simultaneously drilling a plurality of linearly aligned holes, or for fastening linearly aligned fasteners.

BACKGROUND OF THE INVENTION

With respect to the prior art, many patents describe "built-in" non-portable multi bit drills (such as in U.S. Pat. No. 4,090,803 of Haley, U.S. Pat. No. 4,061,437 of Strange, U.S. Pat. No. 4,728,230 of Blum, U.S. Pat. No. 3,652,175 of Walters, U.S. Pat. No. 1,521,158 of King or U.S. Pat. No. 5,217,331 of Ericksen). In addition, non-analogous hand held food mixers with dual rotating blades are described in U.S. Pat. No. 3,280,351 of Wolter, U.S. Pat. No. 1,485,647 of Trust, and U.S. Pat. No. 1,441,416 of Goldstein. Hand held drills are described in U.S. Pat. No. 4,396,318 of Jensen, which has a second non-working collet shaft that goes into the previously drilled hole for stability and marking purposes. U.S. Pat. No. 5,205,682 of Jinkins describes a very complicated hand held drill with multiple driving shafts and U.S. Pat. No. 6,007,277 of Olsen describes a drill which uses one drill bit at a time. Its "multiple drill bits" include idle ones sitting in a revolver carriage. Dual drill bits are described in U.S. Pat. No. 2,706,918 of Blatt, U.S. Pat. No. of 4,286,902 of Gagliano and U.S. Pat. No. 4,678,378 of Koczarski. Also, U.S. Pat. No. 1,183,535 of Chayves discloses a two bit dental drill, but the controlling gear has a large diameter.

However, none of the prior art patents describe a simple, multiple drill bit drill, for simultaneously drilling a plurality of linearly aligned holes, or for fastening linearly aligned fasteners.

OBJECTS OF THE INVENTION

It is therefore an object of the present invention to provide a simple portable, hand-held multiple bit drill for simultaneously drilling a plurality of linearly aligned holes, or for fastening linearly aligned fasteners.

It is also an object to provide an adjustable hand-held multiple bit drill for simultaneously drilling a plurality of linearly aligned holes, or for fastening linearly aligned fasteners, which can be adjusted mechanically.

It is also an object to provide an adjustable hand-held multiple bit drill for simultaneously drilling a plurality of linearly aligned holes, or for fastening linearly aligned fasteners, which can be adjusted by user selection of the number of desired drill bits at a predetermined spacing therebetween.

Other objects which become apparent from the following description of the present invention.

SUMMARY OF THE INVENTION

In keeping with these objects and others which may become apparent, the present invention is a hand-held multiple bit drill for simultaneously drilling a plurality of linearly aligned holes, or for fastening linearly aligned fasteners, which can be optionally adjustable, either mechanically or by user selection of the spacing of chucks for the drill bits.

There are four embodiments for the multiple bit drill, namely:
a) a totally non adjustable version with pre-set, non-adjustable linearly aligned chucks
b) an adjustable version with chucks that can be moved toward or away from each other by gears to vary spacing therebetween,
c) a static adjustable version, where there are provided a plurality of drill bit accommodating chucks, which are set linearly apart from each other a predetermined distance (i.e. ⅝ inch, 1½ inch, etc,) where the adjustability of spacing between drill bits is accomplished by the step of user selection of filling all the chucks (for minimal spacing) or by leaving some of the chucks empty and blank, thereby increasing the spacing between adjacent chucks. For example, by having the chucks spaced ¾ inch apart, but only loading every other one will result in usable chucks having user selected drill bits inserted therein, being spaced apart now 1/1½ inches apart, and so on. This "static adjustable" version significantly reduces the cost of making a truly adjustable one, where the spacing is adjusted by gears swinging out of the way.
d) a pivotable adjustable multi drill bit drill having drive gears of two adjacent drill chucks being pivotably connected by radial arms to a center of a respective rotating idler gear, of a plurality of linearly extending rotating idler gears, wherein the angle of orientation of the radial arms controls the spacing between the chucks.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
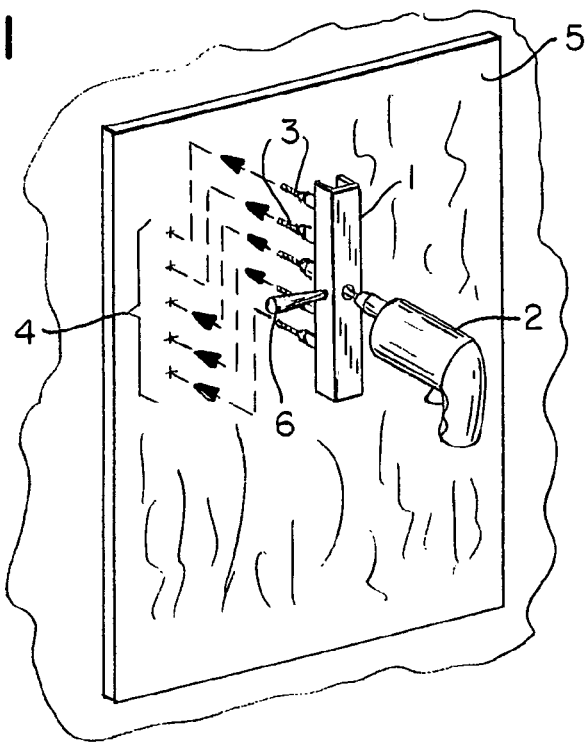
FIG. 1 is a perspective view of the multiple bit drill of this invention, shown in an operating position next to a work piece.

FIG. 1 shows a portable hand-held multiple bit drill 1 of this invention shown next to work piece 5, with a set of linearly aligned holes 4 which were just simultaneously drilled by the five drill bits 3. The rotary power source for multiple bit drill 1 is drill/driver 2, which is a typical hand-held unit as powered by a line-connected AC motor, a battery powered DC motor, or a pneumatic motor. An auxiliary handle 6 can be attached to any version of multiple bit drill 1. This invention can be used to drill multiple accurately spaced linearly aligned holes simultaneously. Alternatively, multiple machine, wood, or sheet metal screws can be driven simultaneously. Blind rivets with screw actuators or other types of rotary applied fasteners can be driven simultaneously in sheet metal or other materials.

Figure 2:
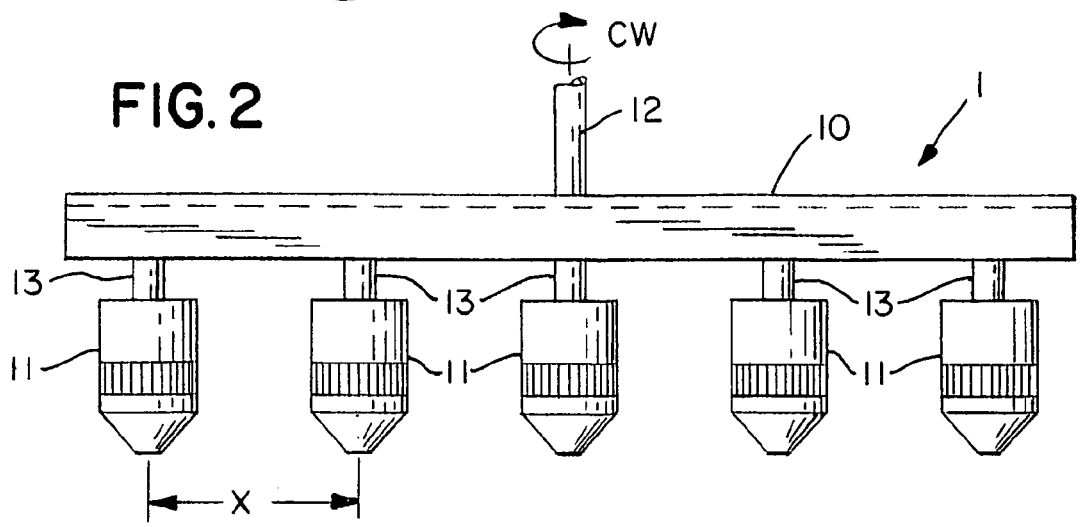
FIG. 2 is a side elevation view in partial cross-section of a non-adjustable embodiment of a multiple bit drill.

FIG. 2 shows a side view of the first embodiment for multiple bit drill 1 of this invention. In this version, a number of chucks 11 with a uniform pre-set spacing "X" attached to U-channel housing 10 is used. Housing 10 is optional lubricated and/or sealed. While five chucks 11 are shown in this illustration, more or fewer can be configured.

Figure 3:
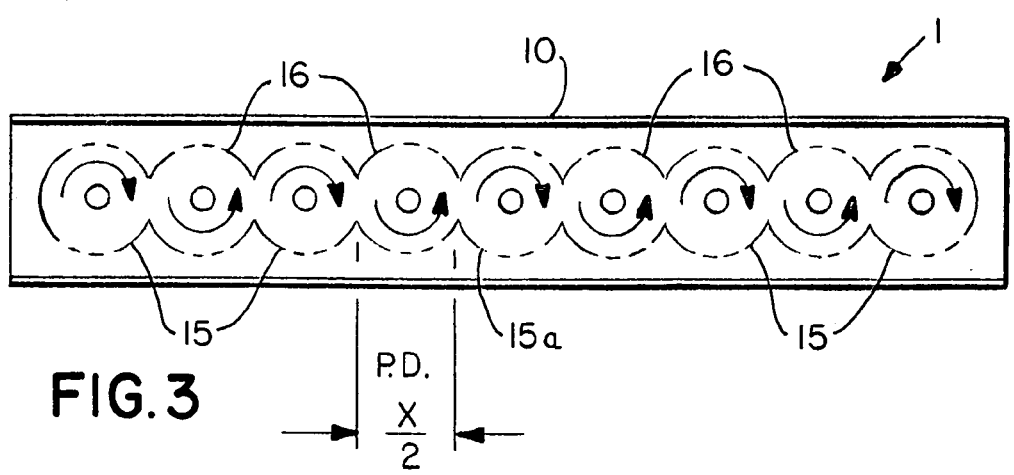
FIG. 3 is a bottom view of a set of gears used to drive multiple drill bits of the non-adjustable embodiment as in FIG. 2.

The bottom view of FIG. 3 is a schematic arrangement of nine gears of equal size with a pitch diameter of one half the centerline spacing, "X", of chucks 11, shown in FIG. 2. The four gears 15 are rigidly attached to shafts 13, which drive each of the chucks 11. Central gear 15a is also rigidly attached to drive shaft 12, which emerges from the top flange of housing 10 and is driven by drill/driver 2. Between each drive gear 15 is a meshed idler gear 16 which reverses direction such that all drive gears 15 are rotated in the same direction. Bearings (not shown) are press fit in nine holes in the top flange of housing 10. While roller or ball bearings are preferable, sleeve bearings or bronze bushings may also be used. Thus the gears 15 rotate in the fixed bearings and all five chucks 11 are driven synchronously.

A second embodiment of multiple bit drill permits different drill spacing by using a variety of idler gears of different diameters. The various parts and details of this embodiment are shown in FIGS. 4 through 9.

Figure 4:
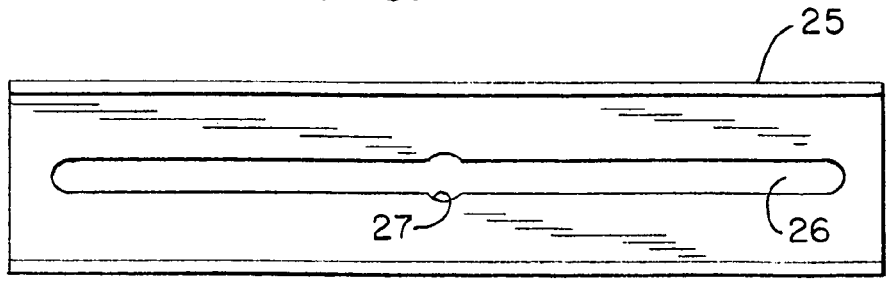
FIG. 4 is a bottom view of the channel housing of a second embodiment of this invention, permitting different spacing through the use of different sized idler gears.

For example, FIG. 4 shows a bottom view of U-channel housing 25 with slot 26 and central hole 27. Housing 25 is wider than housing 10 of the first embodiment, to accommodate larger idler gears.

Figure 5:
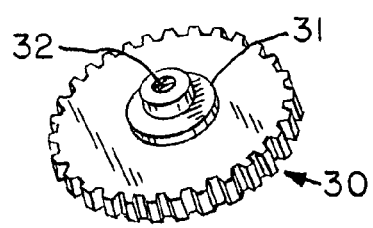
FIG. 5 is a perspective view of an idler gear for use with the embodiment of FIG. 4.

FIG. 5 shows a typical idler gear 30 with attached bearing and mounting flange 31 and internally threaded mounting sleeve 32. Mounting sleeve 32 has an outside diameter that fits accurately within slot 26.

Figure 6:
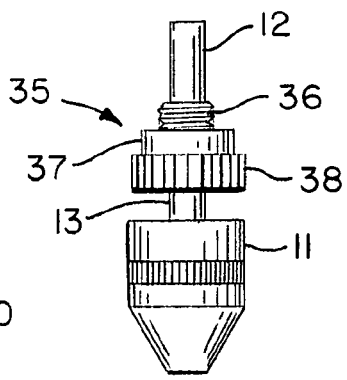
FIG. 6 is a side elevational view of a central chuck, with a drive shaft, for use with the adjustable embodiment of FIG. 4.

FIG. 6 shows the central drive chuck assembly 35 which includes chuck 11, shaft 13 rigidly attached to gear 38, mounting flange 37, threaded sleeve 36 and drive shaft 12. The outside diameter of sleeve 36 fits central hole 27; a nut 36a from the top flange of housing 25 is used to attach it to housing 25.

Figure 7:
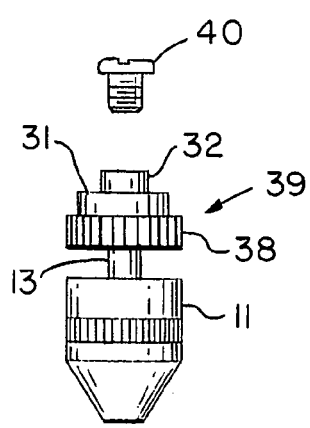
FIG. 7 is a side elevation view of a non-central chuck for use with the second embodiment of this invention.

FIG. 7 shows one of the other chuck assemblies 39 with shaft 13, gear 38 and mounting flange 31, as well as sleeve 32, identical to those on idler gears 30. Gears 38 have a small diameter to permit close placement of chucks 11 when desired. Screws 40 are used to attach and lock in place idler gears 30 as well as chuck assemblies 39. Chuck centerline spacing can be selected by using the appropriate size of idler gear.

Figure 8:
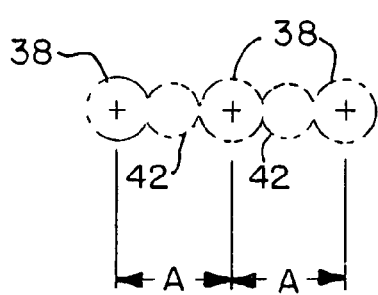
FIG. 8 is a bottom schematic view, showing close drill bit spacing through the use of small idler gears, in the second embodiment.

FIG. 8 shows the close spacing "A" through the use of small diameter idler gears 42.

Figure 9:
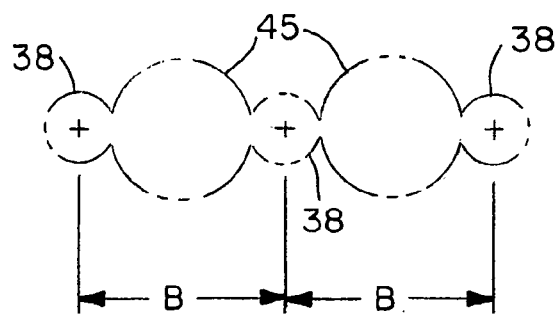
FIG. 9 is a bottom schematic view, showing wide drill bit spacing through the use of large idler gears, in the second embodiment.

FIG. 9 shows wide spacing "B" through the use of large diameter idler gears 45. While only three chucks are shown, any number that would fit housing 25 can be configured.

To set up this second embodiment shown in FIGS. 4–9, screws 40 are started loosely in desired idler gears 30 as well as chuck assemblies 39. These are inserted through hole 27 from the bottom of housing 25 (the head of screws 40 is smaller than hole 27 but larger than slot 26) in the proper order and slid to the left and to the right of hole 27. Then central chuck assembly 35 is placed in hole 27 and a nut is used to lock it in place. Then each of the idlers 30 and chuck assemblies 39 is slid over toward the center, in order, carefully meshing gear teeth and locked in place by tightening screw 40. Then the multiple bit drill of this embodiment is ready for use. Disassembly requires the reverse steps.

Figure 10:
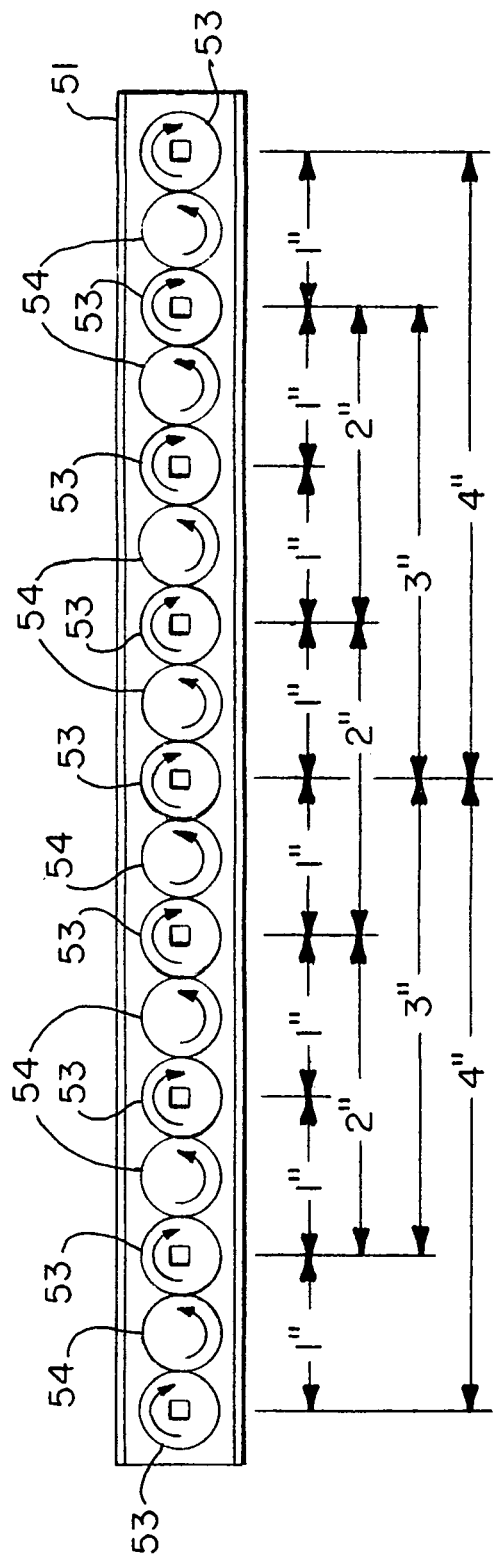
FIG. 10 is a diagrammatic bottom view of a housing with a gear set of a third embodiment of this invention, using user-selectable quick-disconnect chucks to achieve a static adjustable version with step adjustability.
Figure 11:
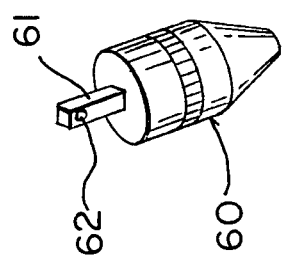
FIG. 11 is a perspective view of a quick-disconnect chuck for use with the static adjustable embodiment of FIG. 10.

While a side view of a third embodiment shown in FIGS. 10 and 11 is very similar to FIG. 2, it differs in several respects. This embodiment permits chuck spacing from a certain minimum to a very wide maximum in multiples of the minimum spacing, without the necessity of changing idler gears. Spacing is accurately maintained, since gear bearings are rigidly mounted (press fit) in holes in a U-channel housing.

Switching to a different spacing in the embodiment shown in FIGS. 10 and 11 is very conveniently accomplished.

FIGS. 10 and 11 describe the essential features of this embodiment. For example, FIG. 10 is a bottom view of housing 51, showing 17 small gears meshed. In this illustration, all gears are assumed to be ½ inch pitch diameter. One of the drive gears 53, positioned in the central location of the plurality of drive gears, has a drive shaft (not shown) which penetrates the top flange of housing 51 and then couples with drill/driver 2. Central drive gear 53, as well as all other drive gears 53, preferably have a blind square hole in the center. Idler gears 54 mesh with the drive gears 53 to insure that all drive gears 53 drive in the same direction and are synchronous. In this example, nine drive gears 53 are shown; fewer or more can be configured.

FIG. 11 shows a chuck 60 rigidly attached to square shaft 61, with spring loaded locking ball 62. Shaft 61 fits into the square holes of drive gears 53 such that a quick-disconnect/connect is formed similar to the mating of a socket wrench handle with a socket wrench. Alternatively, a small powerful magnet can be embedded in the end of each blind square hole within a drive gear to retain chuck 60 by magnetic attraction, in a manner used to retain screw driver bits in some applications. In the latter case, spring loaded ball 62 would be unnecessary. Other attachment devices can be used, such as Allen key fittings.

Therefore, in the "static adjustable" embodiment of FIGS. 10 and 11, a chuck can be simply plugged into any drive gear 52 or 53 as desired. If all drive gears are populated with chucks 60, nine holes can be drilled simultaneously at a 1" spacing. If drive torque is limited, fewer than 9 chucks can be inserted (still at a 1" spacing).

Central drive gear 53 need not be populated, in fact, by populating only the two end drive gears 53, two holes eight inches apart can be drilled simultaneously. Other examples shown in FIG. 10 show four holes at 2 inch spacing, three holes at 3 inch spacing, and three holes at 4 inch spacing.

As a result, user selection of which drive gears 52 or 53 allows for a "static adjustment" of the spacing between actively used chucks with respective drill bits inserted therein.

Figure 12:
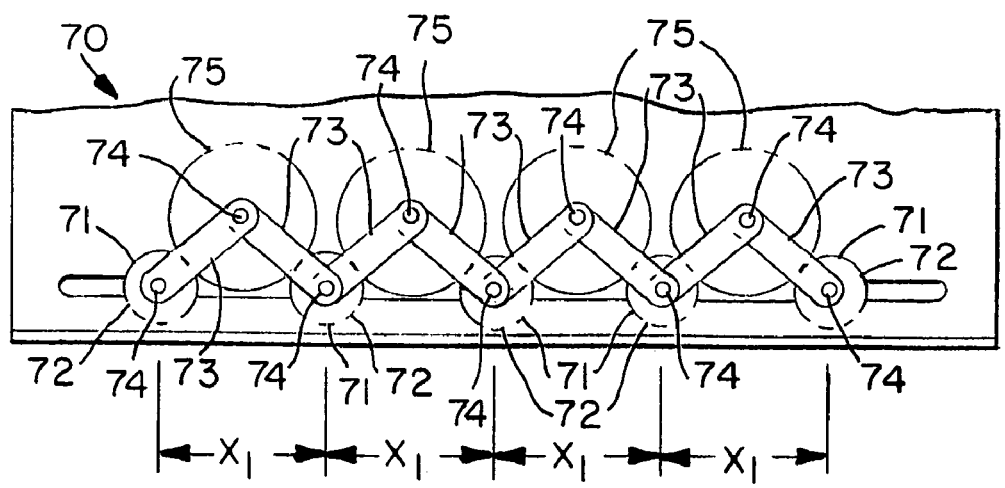
FIG. 12 is a bottom view of an alternate embodiment for a pivotable adjustable multi drill bit drill, shown with close spacing of the drill chucks; and, FIG. 13 is a bottom view of the alternate embodiment for a pivotable adjustable multi drill bit drill as in FIG. 12, shown with wide spacing of the drill chucks.
Figure 13:
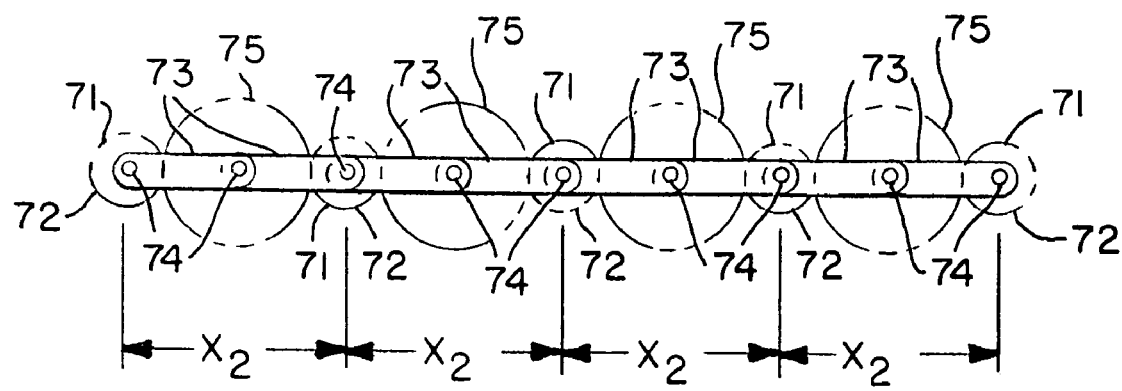

FIGS. 12 and 13 describe an alternate embodiment for a pivotable adjustable multi drill bit drill 70. The drive gears 71 of two adjacent drill chucks 72 are pivotably connected by radial arms 73 to a center 74 of a respective rotating idler gear 75 of a plurality of linearly extending rotating idler gears 75. The driver gears 71 are constrained to be in linear alignment by being placed in a slot in a housing, as in FIG. 4.

FIG. 12 shows the pivoting radial arms 73 connected at distal ends thereof with the chuck drive gears 71 at an acute angle of orientation (such as, for example, 90 degrees apart), to produce close spacing "$X_1$" of the drill chucks 72.

FIG. 13 shows the pivoting radial arms 73 connected at distal ends thereof with the chuck drive gears 71 at opposite directions of orientation (such as, for example, 180 degrees apart), to produce wide spacing "$X_2$" of the drill chucks 72.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A drill comprising:
    a rotary power source communicating with a hand-held body;
    a plurality of chucks, each pair of adjacent chucks having a uniform pre-set spacing;
    said chucks attached to a housing;
    said chucks being simultaneously rotated in a same direction by respective linearly aligned drive gears, said drive gears being rigidly attached to respective shafts driving each respective chuck of said plurality of chucks;
    said drive gears being rotated by a centrally located central gear being rigidly attached to a central drive shaft emerging from said housing,
    said central gear being driven by said power source;
    each said drive gear being meshed with at least one idler gear;
    wherein said housing includes an elongated U-channel housing having a linearly extending slot and a central hole, wherein further each gear is slidably movable in at least one linear direction within said slot.

2. The drill as in claim 1 wherein said pre-set drill spacings between adjacent chucks is accomplished by a diameter of said at least one idler gear.

3. The drill as in claim 1 wherein each said chuck is attached by a respective fastener having an outside diameter permitting said fastener to fit within said central hole.

4. The drill as in claim 1 wherein respective fasteners extend from said top flange of said housing, said fasteners attaching to said respective chucks to said housing.

5. The drill as in claim 1 wherein each said chuck includes a shaft, a gear mounting flange, and a sleeve.

6. The drill as in claim 1 wherein a distance between adjacent chucks is determined by a diameter of said at least one idler gear.

7. The drill as in claim 1, wherein chuck centerline spacing is selected by using a predetermined size of each respective idler gear.

8. The as in claim 7, wherein each said drive gear is adapted to receive idler gears having different diameters.

9. The drill as in claim 1, wherein at least one of said chucks does not include a drill bit.

10. A drill comprising:
    a rotary power source communicating with a hand-held body;
    a plurality of chucks, each pair of adjacent chucks having a uniform pre-set spacing;
    said chucks attached to a housing;
    said chucks being simultaneously rotated in a same direction by respective linearly aligned drive gears, said drive gears being rigidly attached to respective shafts driving each respective chuck of said plurality of chucks;
    said drive gears being rotated by a centrally located central gear being rigidly attached to a central drive shaft emerging from said housing,
    said central gear being driven by said power source;
    each said drive gear being meshed with at least one idler gear;
    wherein fasteners for said chucks are started loosely in desired idler gears and said chucks, said fasteners being inserted through a central hole from the bottom of said housing, wherein respective heads of said fasteners are smaller than said central hole but larger than a linear extending slot, said chucks being positioned in a pre-determined order to the left and to the right of said central hole, said central chuck being placed in said central hole and locked in place.

* * * * *